United States Patent
Kalhan

(10) Patent No.: US 11,122,406 B2
(45) Date of Patent: Sep. 14, 2021

(54) BULK RACH MACHINE TYPE COMMUNICATION (MTC) TRANSMISSIONS

(71) Applicants: Kyocera Corporation, Kyoto (JP); Amit Kalhan, San Diego, CA (US)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 125 days.

(21) Appl. No.: 16/486,424

(22) PCT Filed: Feb. 27, 2018

(86) PCT No.: PCT/US2018/020013
§ 371 (c)(1),
(2) Date: Aug. 15, 2019

(87) PCT Pub. No.: WO2018/164885
PCT Pub. Date: Sep. 13, 2018

(65) Prior Publication Data
US 2020/0037135 A1    Jan. 30, 2020

Related U.S. Application Data

(60) Provisional application No. 62/469,920, filed on Mar. 10, 2017.

(51) Int. Cl.
*H04W 4/70* (2018.01)
*H04W 76/11* (2018.01)
*H04W 4/021* (2018.01)
*H04W 74/08* (2009.01)

(52) U.S. Cl.
CPC ............ *H04W 4/70* (2018.02); *H04W 4/021* (2013.01); *H04W 74/0833* (2013.01); *H04W 76/11* (2018.02)

(58) Field of Classification Search
CPC combination set(s) only.
See application file for complete search history.

(56) References Cited

U.S. PATENT DOCUMENTS

| | | | |
|---|---|---|---|
| 9,654,284 B2 * | 5/2017 | Chen | H04L 9/0869 |
| 2011/0200004 A1 * | 8/2011 | Nakashima | H04W 72/0453 370/330 |
| 2012/0165058 A1 | 6/2012 | Hwang et al. | |
| 2013/0044676 A1 | 2/2013 | Kim et al. | |
| 2013/0064116 A1 * | 3/2013 | Speight | H04B 7/15528 370/252 |

(Continued)

FOREIGN PATENT DOCUMENTS

| | | |
|---|---|---|
| JP | 2012004987 A | 1/2012 |
| WO | 2016095763 A1 | 6/2016 |
| WO | 2016-177435 A1 | 11/2016 |

OTHER PUBLICATIONS

Alcatel-Lucent Shanghai Bell, Alcatel-Lucent; "Discussion on RACH Design for MTC"; R2-101407, 3GPP TSG RAN WG2 #69; Feb. 22-26, 2010; San Francisco, US.

*Primary Examiner* — Andrew C Oh

(57) ABSTRACT

An intermediate station receives device Random Access Channel (RACH) transmissions from a plurality of machine type communication (MTC) devices and transmits at a bulk RACH transmission to a base station where the bulk RACH transmission represents the RACH transmissions from at least two of the device RACH transmissions.

16 Claims, 3 Drawing Sheets

(56) References Cited

U.S. PATENT DOCUMENTS

| | | | | |
|---|---|---|---|---|
| 2013/0070664 A1* | 3/2013 | Nagata | ........ | H04W 72/0453 |
| | | | | 370/315 |
| 2013/0083723 A1 | 4/2013 | Morioka | | |
| 2013/0203416 A1* | 8/2013 | Raaf | ........ | H04W 36/0061 |
| | | | | 455/436 |
| 2014/0161024 A1* | 6/2014 | Speight | ........ | H04W 52/04 |
| | | | | 370/315 |
| 2014/0198716 A1* | 7/2014 | Speight | ........ | H04W 72/04 |
| | | | | 370/315 |
| 2015/0172846 A1* | 6/2015 | Ge | ........ | H04L 67/12 |
| | | | | 370/254 |
| 2015/0237651 A1* | 8/2015 | Nobusawa | ........ | H04W 72/042 |
| | | | | 370/329 |
| 2015/0372801 A1* | 12/2015 | Smee | ........ | H04W 72/048 |
| | | | | 370/296 |
| 2016/0037352 A1* | 2/2016 | Wei | ........ | H04W 72/0453 |
| | | | | 455/454 |
| 2016/0119739 A1* | 4/2016 | Hampel | ........ | H04W 4/38 |
| | | | | 370/315 |
| 2016/0255532 A1* | 9/2016 | Huang | ........ | H04W 4/38 |
| | | | | 370/235 |
| 2017/0111780 A1* | 4/2017 | Alvarino | ........ | H04W 40/22 |
| 2017/0149523 A1* | 5/2017 | Li | ........ | H04L 5/0037 |
| 2017/0265227 A1* | 9/2017 | Wang | ........ | H04W 72/04 |
| 2017/0289957 A1* | 10/2017 | Zhang | ........ | H04W 8/02 |
| 2018/0054248 A1* | 2/2018 | Kahtava | ........ | H04L 47/805 |
| 2018/0132273 A1* | 5/2018 | Zhang | ........ | H04L 5/0053 |
| 2018/0183938 A1* | 6/2018 | Cai | ........ | H04W 72/042 |
| 2020/0288535 A1* | 9/2020 | Sharma | ........ | H04W 36/0033 |

\* cited by examiner

BULK RACH MACHINE TYPE COMMUNICATION (MTC) TRANSMISSIONS

CLAIM OF PRIORITY

The present application claims priority to Provisional Application No. 62/469,920, entitled "RACH Bundling for Massive MTC Deployments", filed Mar. 10, 2017, assigned to the assignee hereof and hereby expressly incorporated by reference in its entirety.

FIELD

This invention generally relates to wireless communications and more particularly to devices and methods for transmitting bulk Random Access Channel (RACH) transmissions.

BACKGROUND

Machine type communication (MTC) is a form of data communication which involves one or more entities that do not necessarily need human interaction. Depending on the particular implementation, an MTC device may communicate with one or more servers or with other devices. The network operator provides network connectivity to MTC server(s) regardless of whether the MTC server is controlled by the network operator. An MTC device is typically a user equipment (UE) device that is equipped for Machine Type Communication and communicates through a public land mobile network (PLMN) with MTC Server(s) and/or other MTC Device(s). In some situations, an MTC device might also communicate locally through a hardwired or wireless connection with other entities.

MTC devices are increasingly being used in a variety of applications. Examples of some of the general areas of use include security, tracking, health, payment, remote diagnostics, metering and consumer electronics. Some of the many specific applications include surveillance system control, control of physical access (e.g. to buildings), fleet management, order management, asset tracking, navigation, traffic information, road tolling, point of sales, vending machines, gaming machines, vital signs monitoring, web access telemedicine points, remote maintenance and control of sensors, lighting, pumps, valves, and elevators, vehicle diagnostics, metering of power, gas, water and heating, grid control, and management and control of digital photo frames, cameras and eBooks.

Massive Machine Type Communications (MTC) deployments require a very large number of low-powered battery-operated devices to connect to the network. These small MTC devices consume very small amount of energy to operate in order to have a very long-battery life (10–20 years). The MTC devices autonomously transmit periodic and/or event-driven data. Therefore, in many cases, a bulk of devices deployed within a small region may attempt to access the network simultaneously. Many wireless systems such as LTE have a procedure for the devices to access the network using Random Access Channel (RACH). Each device is allocated a unique ID that it transmits using periodic time-frequency resources. These simultaneous transmissions may cause congestion if enough resources are not available or if multiple devices use the same resource for their transmissions.

SUMMARY

An intermediate station receives device Random Access Channel (RACH) transmissions from a plurality of machine type communication (MTC) devices and transmits at a bulk RACH transmission to a base station where the bulk RACH transmission represents the RACH transmissions from at least two of the device RACH transmissions.

DETAILED DESCRIPTION

For the examples discussed herein, each of several intermediate stations receive RACH transmissions from multiple MTC devices within the geographical service area of the intermediate station and transmit a bulk RACH transmission to the base station serving the MTC devices. The bulk RACH transmission at least indicates to the base station that multiple MTC devices have transmitted a RACH. The MTC devices and the intermediate stations are located within a base station geographical service area of the base station. Therefore, at least some of the MTC devices within the bases station service area are divided into groups where an intermediate station transmits a bulk RACH representing multiple MTC devices in the associated group. The bulk RACH transmission may invoke a procedure for assigning communication resources to the MTC devices. The communication resources may be for communication with the base station or may be for communication with the intermediate station where, for example, the intermediate station is a relay station. The assigning or communication resources may be performed by the intermediate station, the base station, or combination of the two.

Figure 1:
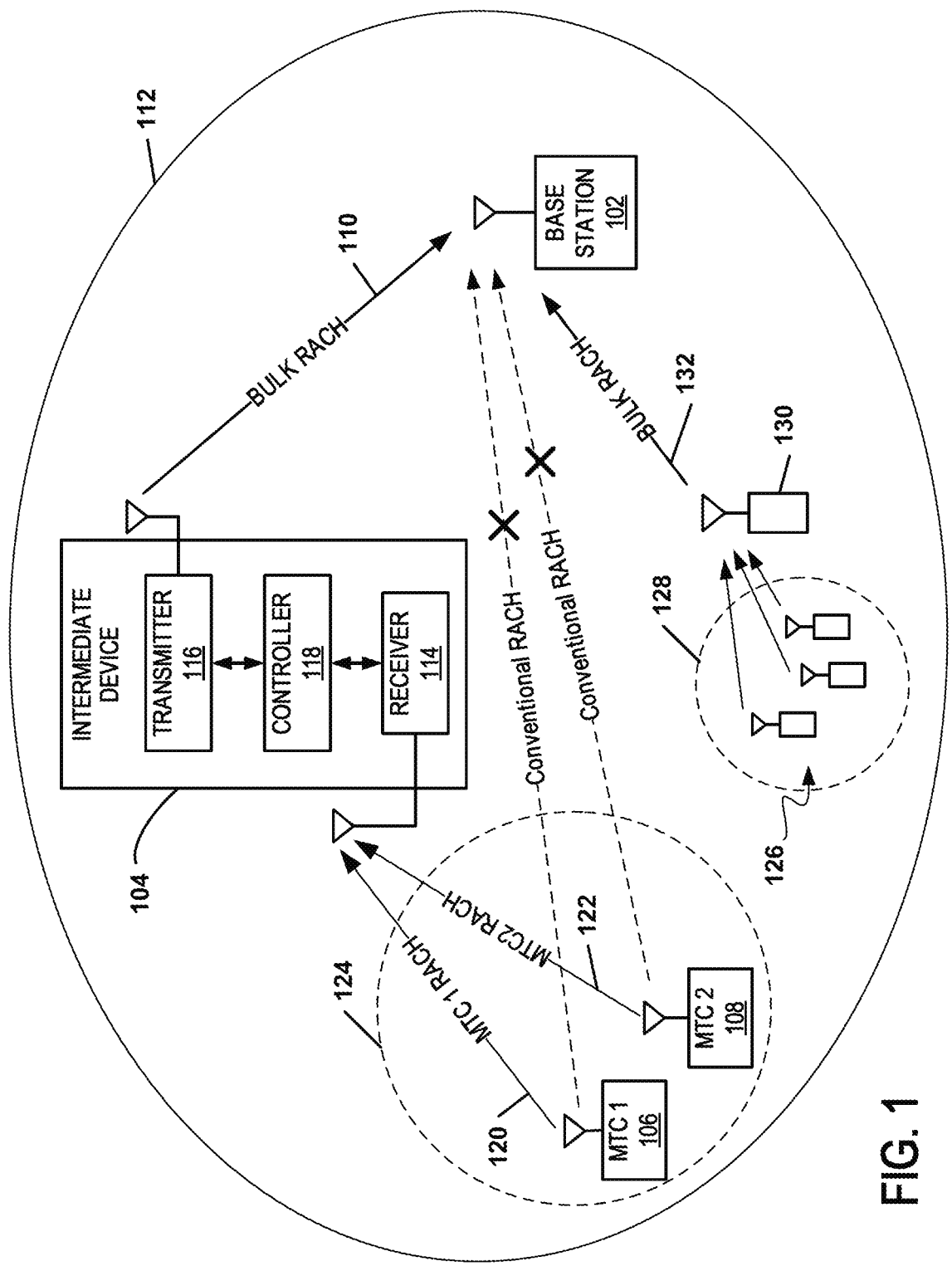
FIG. 1 is a block diagram of a communication system including a base station, an intermediate station, and a plurality of MTC devices where the intermediate station transmits a bulk RACH transmission to the base station.

FIG. 1 is a block diagram of a communication system 100 including a base station 102, an intermediate station 104, and a plurality of MTC devices 106, 108 where the intermediate station 104 transmits a bulk RACH transmission 110 to the base station 102. For the example of FIG. 1, five MTC devices are shown although many situations may include numerous MTC devices. The base station 102 provides wireless service within a geographical base station service area 112. The base station 102 can be any type of base station, access point, radio head, eNodeB, or other device capable of transmitting signals within a geographical service area and performing the functions described herein. The intermediate station 104 can be any relay station, base station, access point, intermediary node, eNodeB, or transceiver station with the functionality discussed herein. In some situations, the intermediate station 104 can be a UE device or MTC UE device. In such situations, the intermediate station 104 is sometimes referred to as a cluster head MTC device.

The MTC devices 106, 108 are devices that employ machine type communication (MTC) and are otherwise user equipment (UE) devices operating on the communication system 100. For the examples herein, the communication system 100 operates in accordance with at least one revision of a 3GPP communication specification as adapted by the description herein although the principles and techniques discussed may be applied to other types of systems in some circumstances.

In conventional systems, each MTC device 106, 108 transmits a Random Access Channel (RACH) transmission to the base station 102 to initiate a procedure to have communication resources assigned to the MTC device for an uplink transmission. For the examples herein, however, the MTC devices transmit RACH transmissions to the intermediate station 104 and do not transmit RACHs to the base station 102. In situations where an intermediate station is not available, the MTC devices transmit RACH transmissions directly to the base station 102. The intermediate station 104 includes a receiver 114, a transmitter 116 and controller 118. In most situations, the receiver 114 is part of a first transceiver that communicates with MTC devices and the transmitter 116 is part of second transceiver that communicates with base stations. The controller 118 is any controller, processor, electrical circuit, logic circuit, processing circuit, or processor arrangement that manages the functions described herein as well as facilitating the overall functionality of the intermediate device 104. The receiver 114 receives a RACH transmission 120, 122 from each of the plurality of MTC devices 106, 108. The transmitter 116 transmits a bulk RACH transmission to the base station 102 which represents RACHs from the MTC devices. In some situations, the bulk RACH transmission 110 includes all of the information contained in the MTC RACH transmissions 120, 122. An example of a suitable technique for transmitting the bulk RACH transmission 110 in such an implementation in an LTE system includes modifying the RACH transmission format to accommodate information from multiple MTC devices. In another example, the bulk RACH transmission 110 does not include all of the information contained in the MTC RACH transmissions but at least indicates to the base station 102 that multiple MTC devices are submitting a RACH. An example of suitable technique for such an indication includes designating and reserving a particular sequence or number of sequences that are to be used for bulk RACH transmissions where other sequences are to be used for individual RACH transmissions. In systems operating in accordance with LTE standards, for example, a preamble based on cyclic-shifts of root Zadoff-Chu (ZC) sequences are used. Preambles with a particular cyclic shift can be used to designate a RACH as a bulk RACH transmission. In some situations, the bulk RACH transmission includes information regarding the number of MTC devices submitting a RACH, the type of communication resources and/or the bandwidth requested by each MTC devices, and/or the total combined bandwidth requested by all of the MTC devices. Other information may also be included in some situations. In one example, the bulk RACH transmission has a third sequence representing a first sequence transmitted by the first MTC device and a second sequence transmitted by the second MTC device. The intermediate station can apply a Look-Up-Table (LUT) to select a sequence for the bulk RACH transmission. For example, a first sequence may represent two RACH transmissions for two devices and a second sequence can represent three RACH transmissions for three devices, and so on. Also, the bulk RACH sequence can be a function of which devices are transmitting the MTC RACH transmission within each respective group.

In conventional systems, as discussed above, the high number of MTC devices simultaneously contending for resources by transmitting RACH can result in a large number of transmission collisions and delays. With conventional techniques, the resources for RACH transmissions are available to all MTC devices within the base station geographical service area 112. In accordance with examples discussed herein, however, RACH resources can be reused by each group of MTC devices transmitting to an intermediate device 104. Therefore, the plurality of MTC devices 106, 108 in a first geographical area 124 can use the same RACH resources as a second group of MTC devices 126 in a second geographical area 128 without transmission collisions between the two groups. A second intermediate device 130 transmits a bulk RACH transmission to the base station 102.

In addition to reusing the RACH resources between groups of MTC devices, the RACH preambles sequences can also be reused in some situations. Such a scheme allows the intermediate station 104 to have a less complex receiver 116 and reduces processing delays at the receiver 116. Geo-spatial diversity allows multiple devices to transmit the same preamble sequence. For example, one MTC device can transmit a RACH using a sequence to a first intermediate station (node 1) and another MTC device can transmit a RACH using the same sequence to another intermediate station (node 2). If the intermediate stations (nodes) are far enough from each other, the interference at the respective receivers is mitigated.

Although FIG. 1 shows only two MTC devices, more than two MTC devices may be transmitting MTC RACH transmissions to the intermediate station 104. In some situations, the intermediate station 104 generates and transmits bulk RACH transmissions as MTC RACH transmissions are received. In other situations, however, the intermediate station 104 may apply criteria to the received MTC RACH transmissions to determine which RACHs are represented in a particular bulk RACH transmission. For example, the intermediate station 104 may group MTC RACHs with similar priority into the same bulk RACH transmission and transmit bulk RACH transmissions representing higher priority MTC RACHs before bulk RACH transmissions having lower priority RACHs. In addition, the intermediate station 104 may be configured to only transmit a bulk RACH transmission when a minimum number of MTC RACH transmissions have been received. As discussed below, the time-frequency channels allocated for the MTC RACH transmissions and the bulk RACH transmissions may have different frequencies, durations and periodicities.

Figure 2:
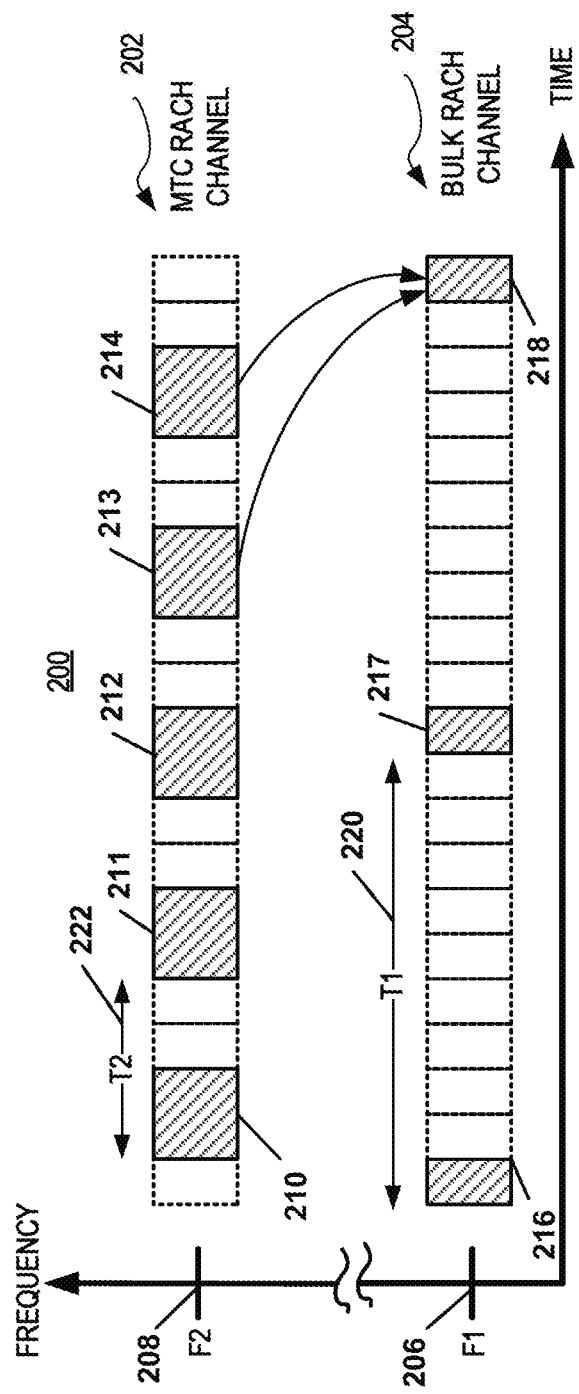
FIG. 2 is a time-frequency illustration of the MTC RACH channel and the bulk RACH channel.

FIG. 2 is a time-frequency illustration 200 of the MTC RACH channel 202 and the bulk RACH channel 204. For the examples herein, the bulk RACH channel 204 has a first frequency (F1) 206 and the MTC RACH channel 202 has a second frequency (F2) 208. Examples of suitable frequencies include 800 MHz for the first frequency F1 206 and 5 GHz for the second frequency F2 208. MTC devices can transmit MTC RACH transmissions during the periodic transmission times 210-214 and intermediate devices can transmit bulk RACH transmissions during the periodic transmission times 216-218. The transmission times for the two channels may have different durations. The transmission period (T1) 220 for the bulk RACH channel 204 is different from the transmission period (T2) 222 of the MTC RACH channel 202. For the example of FIG. 2, the transmission period T1 220 is longer than the transmission period T2 222. Such an arrangement may be suitable when delays at the MTC are tolerable. In this case, the intermediate station waits longer to accumulate the RACH transmissions from many several MTC devices before transmitting the bulk RACH to the base station. This efficiency come at the cost of higher latency which is typically tolerable by most MTC applications. In some situations, the transmission period T2 222 is longer than the transmission period T1 220. This may be useful where inefficient use of RACH resources by the intermediate station are tolerable or an application at a MTC device cannot tolerate a delay. For the examples herein, the transmission periods are dynamically adjusted by the system 100. In some situations, the transmission periods may be semi-statically adjusted. The selected time periods may be based on one or more factors including a number of MTC devices with in the geographic area 124, an expected number of RACH transmission from each MTC device, a number of MTC groups utilizing an intermediate station in the base station geographical service area 112, and a number of preamble sequences that determines the decoding/processing delay at both the intermediate station and the base station receivers.

For the example of FIG. 2, the intermediate station transmits, within the bulk RACH channel transmission time 218, a bulk RACH transmission 110 that represents MTC RACH transmissions transmitted within the MTC RACH channel transmission times 213, 214.

Figure 3:
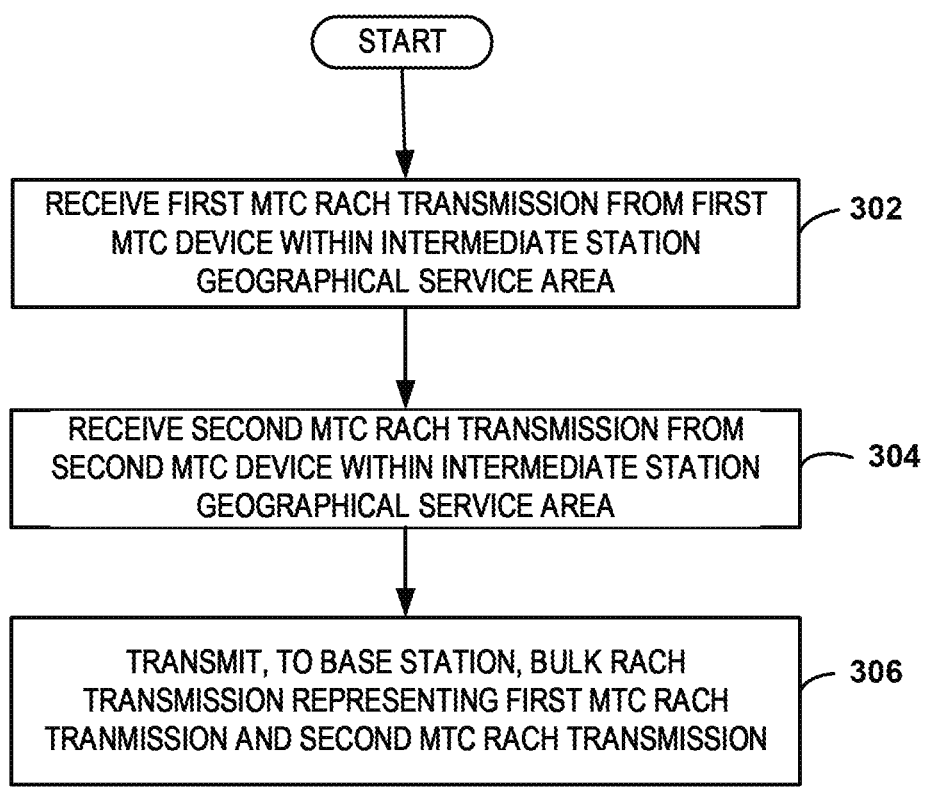
FIG. 3 is a flow chart of a method of transmitting a bulk RACH transmission from an intermediate station.

FIG. 3 is a flow chart of a method of transmitting a bulk RACH transmission from an intermediate station. The steps of FIG. 3 can be performed in a different order than shown and some steps may be combined into a single step. Additional steps may be performed and some steps may be omitted. For the example, the method is performed by an intermediate station such as the intermediate station 104.

At step 302, a first MTC RACH transmission is received from a first MTC device within the intermediate station geographical service area of the intermediate station.

At step 304, a second MTC RACH transmission is received from a second MTC device within the intermediate station geographical service area of the intermediate station.

At step 306, a bulk RACH transmission is transmitted to the base station where the bulk RACH transmission represents the first MTC RACH transmission and the second MTC RACH transmission. As discussed above, the RACH resources used by the first MTC device and second MTC device may be the same resources used by other MTC devices in other groups within other intermediate station geographical service areas. In addition, preamble sequences may also be reused by the MTC groups for RACH transmission. In some situations, as discussed above, the bulk transmission can have a third sequence representing a first sequence transmitted by the first MTC device and a second sequence transmitted by the second MTC device. Further, the intermediate station can apply a Look-Up-Table (LUT) to select a sequence for the bulk RACH transmission. For example, a first sequence may represent two RACH transmissions for two devices and a second sequence can represent three RACH transmissions for three devices, and so on. Also, the bulk RACH sequence can be a function of which devices are transmitting the MTC RACH transmission within each respective group.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. An intermediate station comprising:
a receiver configured to receive a first machine type communication (MTC) Random Access Channel (RACH) transmission from a first MTC device and to receive a second MTC RACH transmission from a second MTC device;
a transmitter configured to transmit a bulk RACH transmission to a base station, the bulk RACH transmission representing the first MTC RACH transmission and the second MTC RACH transmission, wherein the bulk RACH transmission has a cyclically shifted Zadoff-Chu sequence indicating the bulk RACH transmission has been transmitted by a RACH aggregator and represents a plurality of RACHs from multiple MTC devices.

2. The intermediate station of claim 1, wherein the bulk RACH transmission indicates a number of MTC devices transmitting a RACH to the intermediate station.

3. The intermediate station of claim 2, wherein the intermediate station is configured to apply a Look-Up-Table (LUT) to select a sequence for the bulk RACH transmission from a plurality of sequences, each of the plurality associated with a number of MTC devices submitting a RACH.

4. The intermediate station of claim 1, wherein the bulk RACH transmission indicates a first identity of the first MTC device and a second identity of the second MTC device.

5. The intermediate station of claim 4, wherein a sequence of the bulk RACH transmission indicates the first identity and the second identity.

6. The intermediate station of claim 1, wherein the intermediate station receives RACH transmissions only from MTC devices within a local geographical area smaller than a base station service area of the base station and within the base station service area.

7. The intermediate station of claim 1, wherein, the first MTC RACH transmission has a first sequence, the second MTC RACH transmission has a second sequence, and the bulk RACH transmission has a third sequence representing the first sequence and the second sequence.

8. The intermediate station of claim 1, wherein the intermediate station is configured to:
receive MTC RACH transmissions from MTC devices through a MTC RACH channel having a first carrier frequency and a first channel repeating transmission time; and
transmit the bulk RACH transmissions to the base station through a bulk RACH channel having a second carrier frequency and a second channel repeating transmission time.

9. The intermediate station of claim 8, wherein the first channel repeating transmission time has a first channel time period and the second channel repeating transmission time has a second channel time period different from the first channel time period.

10. The intermediate station of claim 9, wherein at least one of the first channel time period and the second channel time period is dynamically adjusted.

11. The intermediate station of claim 1, wherein the receiver and the transmitter operate in accordance with at least one revision of The Third Generation Partnership Project (3GPP) Long Term Evolution (LTE) communication specification.

12. A wireless communication system comprising:
a first intermediate station comprising:
a first receiver configured to receive a first machine type communication (MTC) Random Access Channel (RACH) transmission from a first MTC device and to receive a second MTC RACH transmission from a second MTC device, the first MTC device and the second MTC device within a first intermediate station geographical service area; and
a first transmitter configured to transmit a first bulk RACH transmission to a base station, the first bulk RACH transmission representing the first MTC RACH transmission and the second MTC RACH transmission, wherein the first bulk RACH transmission has a first cyclically shifted Zadoff-Chu sequence indicating the first bulk RACH transmission has been transmitted by a RACH aggregator and represents a plurality of RACHs from multiple MTC devices; and
a second intermediate station comprising:
a second receiver configured to receive a third MTC RACH transmission from a third MTC device and to receive a fourth MTC RACH transmission from a fourth MTC device, the third MTC device and the fourth MTC device within a second intermediate station geographical service area; and
a second transmitter configured to transmit a second bulk RACH transmission to the base station, the second bulk RACH transmission representing the third MTC RACH transmission and the fourth MTC RACH transmission, wherein the second bulk RACH transmission has a second cyclically shifted Zadoff-Chu sequence indicating the second bulk RACH transmission has been transmitted by a RACH aggregator and represents a plurality of RACHs from multiple MTC devices, the same communication resources assigned for MTC RACH transmission within the first intermediate station geographical service area and the second intermediate station geographical service area.

13. The system of claim 12, wherein at least one preamble assigned for MTC RACH transmission in the first intermediate station geographical service area is assigned for MTC RACH transmission in the second intermediate station geographical service area.

14. A method comprising:
receiving a first machine type communication (MTC) Random Access Channel (RACH) transmission from a first MTC device within an intermediate station geographical service area;
receiving a second MTC RACH transmission from a second MTC device within the intermediate station geographical service area; and
transmitting, to a base station, a bulk RACH transmission representing the first MTC RACH transmission and the second MTC RACH transmission, wherein the bulk RACH transmission has a cyclically shifted Zadoff-Chu sequence indicating the bulk RACH transmission has been transmitted by a RACH aggregator and represents a plurality of RACHs from multiple MTC devices.

15. The method of claim 14, wherein the bulk RACH transmission indicates a number of MTC devices transmitting a RACH to the intermediate station.

16. The method of claim 14, wherein the bulk RACH transmission indicates a first identity of the first MTC device and a second identity of the second MTC device.

* * * * *